United States Patent
Ma

(10) Patent No.: US 8,326,956 B2
(45) Date of Patent: Dec. 4, 2012

(54) SYSTEM AND METHOD FOR HANDLING PERSISTENCE INFORMATION IN A NETWORK

(75) Inventor: Kevin Ma, Nashua, NH (US)

(73) Assignee: Cisco Technology, Inc., San Jose, CA (US)

(*) Notice: Subject to any disclaimer, the term of this patent is extended or adjusted under 35 U.S.C. 154(b) by 1432 days.

(21) Appl. No.: 11/394,551

(22) Filed: Mar. 31, 2006

(65) Prior Publication Data

US 2007/0233851 A1 Oct. 4, 2007

(51) Int. Cl.
*G06F 15/173* (2006.01)
(52) U.S. Cl. .................................. 709/223; 709/224
(58) Field of Classification Search .................. 709/220, 709/225, 226, 224, 228, 223
See application file for complete search history.

(56) References Cited

U.S. PATENT DOCUMENTS

| | | | |
|---|---|---|---|
| 6,484,143 B1 | 11/2002 | Swildens et al. | |
| 6,754,699 B2 | 6/2004 | Swildens et al. | |
| 6,754,706 B1 | 6/2004 | Swildens et al. | |
| 6,889,181 B2 | 5/2005 | Kerr et al. | |
| 6,889,259 B2 | 5/2005 | Kapoor | |
| 6,907,525 B2 | 6/2005 | Pazi et al. | |
| 7,321,926 B1* | 1/2008 | Zhang et al. | 709/220 |
| 2006/0064478 A1* | 3/2006 | Sirkin | 709/223 |
| 2008/0082647 A1* | 4/2008 | Baker | 709/223 |
| 2010/0095008 A1* | 4/2010 | Joshi | 709/228 |
| 2010/0131639 A1* | 5/2010 | Narayana et al. | 709/224 |

OTHER PUBLICATIONS

Pete Tenereillo, "Why DNS Based Global Server Load Balancing (GSLB) Doesn't Work", Aquired at: http://tenereillo.com/GSLBPageOfShame.htm, 17 pages, Mar. 11, 2004, Copyright Tenereillo, Inc. 2004.
"Cisco GSS 4400 Series Global Site Selector Appliances", Aquired at: http://cisco.com/en/US/products/hw/contnetw/ps4162/index.html, 1 page, Copyright 1992-2006 Cisoc Systems Inc.
"Big-IP Global Traffic Manager", Aquired at: http://www.f5.com/products/bigip/gtm/index.html, 2 pages, Copyright 1995-2006 F5 Networks.

* cited by examiner

*Primary Examiner* — Brian P Whipple
(74) *Attorney, Agent, or Firm* — Fish & Richardson P.C.

(57) ABSTRACT

A system and method for selectively using persistence information in a network. In a specific embodiment, the system includes a proxy device for the client, wherein the proxy device includes a mechanism for employing persistence information associated with the client to perform a function for the client via the network. In a more specific embodiment, the persistence information includes information enabling the proxy device to resolve one or more domain names similarly to a client for which the appliance is resolving the one or more domain names. The system further includes a database that is adapted to maintain the persistence information pertaining to a connection between the client and the server. The proxy device is adapted to employ the persistence information to facilitate implementing a network appliance. The appliance may implement various functions on behalf of the client, such as a pre-fetch function, a refresh function, and so on.

29 Claims, 5 Drawing Sheets

SYSTEM AND METHOD FOR HANDLING PERSISTENCE INFORMATION IN A NETWORK

BACKGROUND OF THE INVENTION

This invention is related in general to networks and more specifically relates to systems and methods for handling persistence information in a network.

For the purposes of the present discussion, persistence information may be any information pertaining to associations or mappings that persist or are maintained or should persist or should be maintained between entities involved or to be involved in a communications session. Examples of persistence information include, but are not limited to, associations between domain names and Internet Protocol (IP) addresses; mappings between Virtual Internet Protocol (VIP) addresses and server IP addresses; rules or policies for mapping domain names to IP addresses for a given client IP address, and so on.

Systems for handling persistence information are employed in various demanding applications including web-browsing applications involving routing client requests to specific servers and/or Server Load Balancers (SLBs) and applications involving routing client requests from a given SLB to a given real server. Such applications often demand robust systems and methods for maintaining network persistence policies, such as domain-name persistence policies, that enhance network Quality of Service (QOS) and traffic management capabilities.

Robust persistence policies and accompanying systems and methods for enforcing the policies are particularly important in Domain Name Server (DNS) applications involving communications between clients and servers. In such applications, failure of a client to maintain appropriate domain-name and IP-address relationships may cause a client, such as a personal computer with a browser, to retrieve an inappropriate website or instance thereof.

When a user enters a domain name for a website in a client, the client often queries an external DNS to retrieve an IP address associated with the domain name and the website. The query results may be stored in a local client-side DNS cache. The IP address facilitates establishing a connection between the client and a website and further facilitates routing requests therebetween via the network. The process involving obtaining an IP address for a requested domain name or web address associated with a desired website or web page is called DNS resolution.

For availability, scalability, and redundancy purposes, a given website may be hosted via multiple servers that are fronted by an SLB. The SLB may be fronted by a GSLB, which facilitates routing client requests for server content between geographically distributed servers at different physical sites. Such applications often require that a given mapping between a client IP address and a Virtual IP (VIP) address associated with a server or SLB hosting a desired website be maintained, i.e., that the mapping persist. This ensures that subsequent requests for website content will not result in the client retrieving different content from another server employed to host another version of the website.

Unfortunately, conventional systems and methods for enforcing persistence policies for a given client communication session are generally not keeping pace with advances in network appliances and accompanying changes in network topology.

DETAILED DESCRIPTION OF EMBODIMENTS OF THE INVENTION

A preferred embodiment of the present invention implements a system for selectively handling persistence information. In a specific embodiment, the system includes a client, a server, and a database in communication with the client. The database, which may be implemented in a GSLB and/or SLB device, is adapted to maintain persistence information pertaining to a connection between the client and the server. A network proxy device, is adapted to employ the persistence information to facilitate implementing an appliance, such as a Cisco Application Velocity (AVS) device.

In a more specific embodiment, the network proxy device includes a network appliance. The network appliance may implement various functions on behalf of the client, such as selecting content, directing content requests, caching content, pre-fetching content, refreshing content, etc.

By efficiently employing persistence information to perform actions on behalf of the client, the appliance avoids various errors that might occur if the client persistence information were not employed to facilitate performing the actions. For example, if the persistence information is not employed, the appliance may retrieve information on behalf of the client from an inappropriate server. Hence, use of embodiments of the present invention may yield improved Quality Of Service (QOS) in networks employing network proxy applications.

For clarity, various well-known components, such as power supplies, modems, gateways, firewalls, network cards, Internet Service Providers (ISPs), standby modules, content switching modules, and so on, have been omitted from the figures. However, those skilled in the art with access to the present teachings will know which components to implement and how to implement them to meet the needs of a given application.

Figure 1:
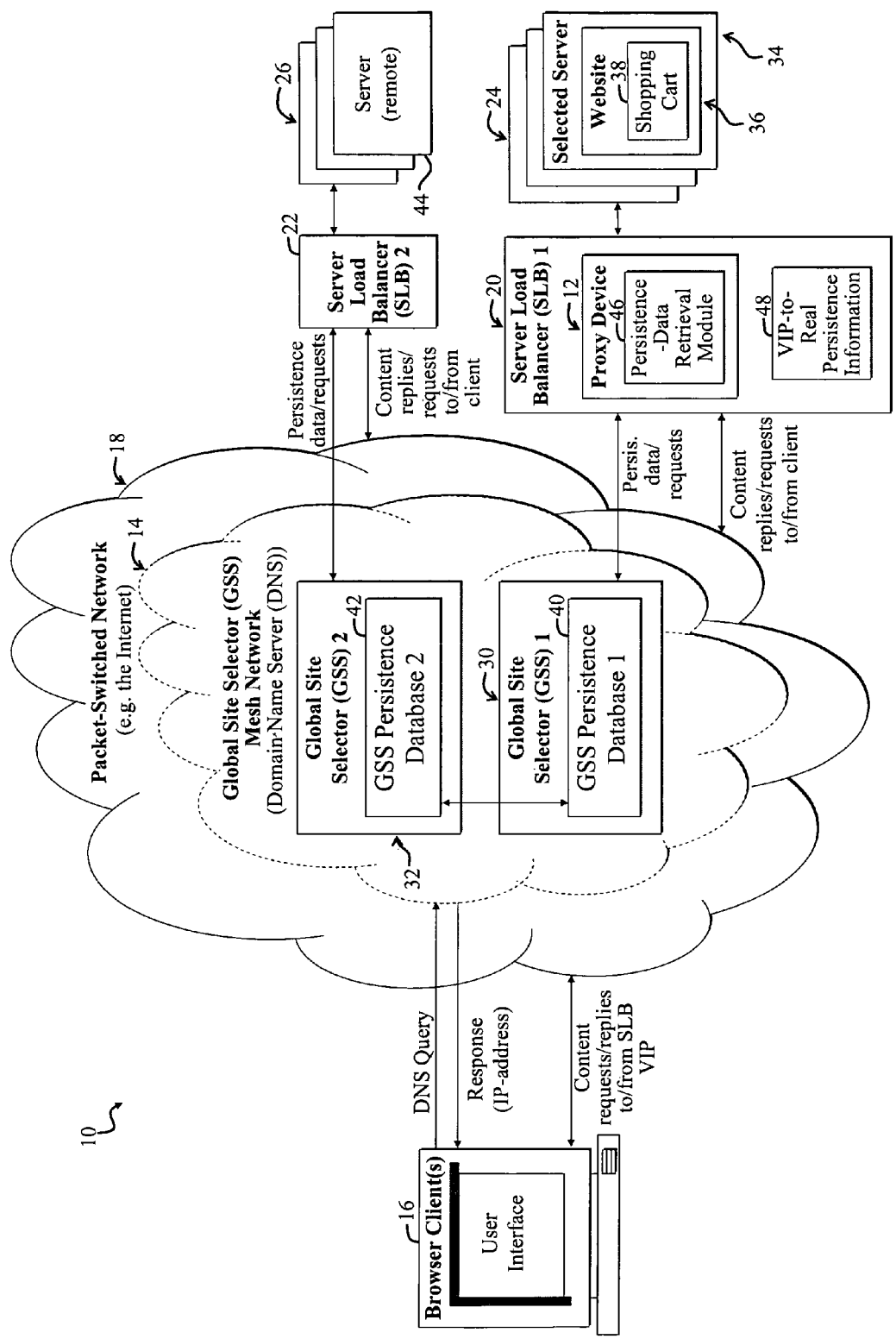
FIG. 1 is a diagram of a network employing a system for enforcing Domain Name Service (DNS) persistence for a network proxy device according to a first embodiment of the present invention that employs a Global Site Selector (GSS) mesh network.

FIG. 1 is a diagram of a network 10 illustrating a system for enforcing Domain Name Service (DNS) persistence for a network proxy device 12 according to a first embodiment of the present invention that employs a Global Site Selector (GSS) mesh network 14, also called a GSS mesh. For the purposes of the present discussion, a network proxy may be any device, hardware or software module, or other entity employed to perform an action or function for the client. Similarly, a proxy device may be any device that acts on behalf of another device or entity. The terms proxy device and network proxy are used interchangeably herein. Examples of proxy devices include appliances, such as Content Engines (CEs), which may perform caching for a given client; appliances for automatically refreshing websites in a client user interface when website content changes; appliances for performing an eXtensible Stylesheet Language Transformation (XSLT) translation function and/or a Business Process Execution Language (BPEL) processing function, email scanning, virus scanning, IM-message scanning, SLBs, Secure Socket Layer (SSL)/compression-offload devices, and so on.

An XSLT-translation function may be any feature and/or accompanying routine that is adapted to perform XSLT translation. Similarly, a BPEL-processing function may be any feature and/or accompanying routine that is adapted to perform BPEL processing. BPEL-processing functions are often implemented via BPEL-processing modules.

In the present specific embodiment, the network 10 further includes a client device 16 in communication with a GSS 30, 32 via a packet-switched network 18, such as the Internet. The GSS 30, 32 may further be a member of a GSS mesh network 14, to facilitate the sharing of information, including persistence information. The client device 16 communicates with the GSS 30, 32, acting as a DNS. Typically, client devices do not otherwise have access to the GSS mesh network 14, which may be private. Certain new appliances constructed in accordance with certain embodiments of the present invention may now join GSS mesh network 14, as discussed more fully below.

The client device 16 further communicates with a first Server Load Balancer (SLB) 20 and a second SLB 22, which are coupled to the GSS mesh network 14 and communicate with a first set of servers 24 and a second set of servers 26, respectively. This communication involves the client device 16 obtaining one or more VIPs from the GSS 30, 32, but does not generally involve the client communicating through the GSS mesh network 14. After the client device 16 obtains a VIP from the GSS 30, 32, the client device 16 then issues a request to the VIP, which is hosted by one of the SLBs 20, 22.

For the purposes of the present discussion, various devices, such as GSSs and Content Services Switches (CSSs) are separate entities. However, certain embodiments disclosed herein facilitate augmenting GSSs, CSSs, and other network proxy devices to access the GSS mesh, such as the GSS mesh network 14, and gather DNS persistence information for themselves as needed.

The first SLB 20 fronts the first set of servers 24. Similarly, the second SLB 22 fronts the second set of servers 26. An SLB is said to front a server when traffic to and from the server and an outside network, such as the packet-switched network 18, passes through the SLB.

For illustrative purposes, the GSS mesh network 14 is shown including a first GSS 30 and a second GSS 32, which intercommunicate via the mesh network 14. The mesh network 14 is shown residing in the packet-switched network 18.

The first GSS 30 includes a first persistence database 40, and the second GSS 32 includes a second persistence database 42. Generally, GSSs in a GSS mesh network maintain one or more similar persistence databases. GSS persistence databases are kept synchronized, i.e., maintained with similar information, via communications through the associated GSS mesh network. Certain embodiments of the present invention now allow other proxy devices, such as the proxy device 12, to maintain full or partial persistence databases for themselves, by either joining the GSS mesh network 14 or by sending queries thereto, as discussed more fully below.

While a database may be shown as a single module or entity in the figures, a database may be distributed throughout a network without departing from the scope of the present invention.

While, for illustrative purposes, certain persistence databases 40, 42 are shown in the GSSs 30, 32 in FIG. 1, other databases, such as VIP-to-Real persistence databases 48 included in one or more Cisco Content Services Switch SLBs 20, 22 may be employed with embodiments of the present invention.

The first SLB 20 is shown coupled to the network proxy device 12, however the network proxy device 12 may be integrated with the first SLB 20 or coupled to the first SLB 20, such as via an Internet connection or other connection to the packet-switched network and/or GSS mesh network 14.

The embodiment of FIG. 1 is discussed primarily with respect to the sharing of persistence information, such as DNS-to-VIP information, between the GSS mesh network 14 and the proxy device 12.

For illustrative purposes, the first set of servers 24 is shown including a selected server 34, which hosts a website 36 with a shopping cart 38. The selected server 34 corresponds to a server involved in a current communication session with the client 16 as discussed more fully below. The client 16 may be implemented via any type of hardware and/or software application that requests data via the packet-switched network 18. For example, the client 16 may be implemented via a browser-equipped personal computer that is connected to the packet-switched network 18.

While the present embodiment is discussed with respect to a specific exemplary network topology, embodiments of the present invention are not limited thereto. For example, various different network topologies may be employed, including topologies employing Data Centers (DCs), more or fewer SLBs, one or more Global Server Load Balancers, plural clients, and so on. Furthermore, one or more of the modules, such as the GSSs 30, 32 and the SLBs 20, 22 may be integrated or distributed in different ways or connected directly to the client 16 instead of through the packet-switched network 18.

For the purposes of the present discussion, a GSS mesh network, such as the GSS mesh network 14, may be any network that includes a module (such as one or more of the GSS modules 30, 32) that is capable of acting as a DNS and maintaining persistence information associated with a DNS request made by a client for a given domain name. While a GSS mesh network is defined broadly above, the preferred embodiment employs a Cisco GSS that acts as a proprietary communications overlay, employed by constituent GSSs for sharing, synchronizing and updating persistence and proximity information between the multiple constituent GSSs.

A DNS request may be any request for a network address based on a domain name. A domain name may be any descriptive characterization of a numerical network address, such as an IP address. Hence, text-based web address associated with a given page in a website may also be considered to be a domain name for the purposes of the present discussion.

An IP address may be any address provided by a DNS in response to a DNS request. Accordingly, a Virtual Internet Protocol (VIP) address is considered to be a type of IP address.

A DNS request may be any request by a client or other network entity to convert a domain name into an IP address. DNS requests are often sent by a client to a specialized database application called a Domain Name Server (DNS).

A DNS server may be any authoritative network entity or collection thereof that may translate a domain name into an IP address.

A client request may be any query, such as a DNS query, or other signal issued with the intent to receive a response. For example, a client request may include a request to view content on a particular web page of a specific website. Examples of client requests include DNS requests and HTTP requests. A DNS request may be a request to a DNS server for a DNS address associated with a domain name as with a Uniform Resource Locator (URL) for a webpage. An HTTP request may be sent to a particular web server for content pertaining to a website or webpage hosted by the server.

In operation, a user enters a desired domain name into the client 16, such as via a web-browser user interface. The client 16 then issues a query, in particular, a client DNS request, to a DNS, requesting that the DNS translate the domain name into an IP address. In the present specific embodiment, the DNS is implemented via the GSSs 30, 32.

One of the GSSs 30, 32 responds to the client DNS request with an IP address associated with the domain name that was the subject of the DNS request. The responding GSS will register the IP address of the client (client IP address) and subsequently maintain persistence information in the GSS persistence databases 40, 42 pertaining to the client IP address. The persistence information is distributed to the other GSS devices via the mesh network 14.

The persistence information may include any information pertaining to associations or mappings between a domain name and an IP address for a given client. The persistence information may further include any persistence policies, rules, or methods employed by a given network entity, such as the GSS 30, 32. For example, information maintained by the GSS 30, 32 in one or more databases, such as the persistence-information databases 40, 42, indicating how a given client DNS request would be resolved is also considered to be persistence information. Persistence information may be stored in a proximity database or virtually any other type of database employed to resolve domain names for particular clients.

The GSS 30, 32 may employ various factors, such as SLB availability, proximity to the client 16 (numbers of router hops), site-response time, numbers of servers fronted by an SLB, numbers of connections available through a given server, and so on, to determine how to resolve a given client DNS request. Such factors and accompanying methods for resolving DNS requests may also be considered to be persistence information.

In an exemplary operative scenario, the GSS 30, 32 employs proximity information, such as information available in a proximity database, to resolve a given domain name, such as a domain name provided by the client 16 in a DNS request, to a VIP address associated with the first SLB 20. Subsequently, requests by the client 16 for content from a server and/or website associated with the domain name are routed to the first SLB 20 via the intervening packet-switched network 18.

After the client 16 receives the response to the DNS request from the GSS 30, 32, the returned DNS-to-VIP mapping information is held in DNS cache of the client 16. If the client 16 were to try and re-resolve the information, the client 16 would get the same persistent mapping from the GSS 30, 32.

The first SLB 20 receives requests for content from the client 16 and subsequently employs Network Address Translation (NAT) to map the VIP associated with the client request for content to a specific server, such as the selected server 34 in the first group of servers 24. Information and rules employed by the first SLB 20 to map the client request to the selected server 34 and associated content 36 are also considered to represent persistence information. This so-called VIP-to-real server persistence information 48 is maintained, for a predetermined time period, by the first SLB 20 for a given client so that requests by that client 16 are persistently routed to the same server 34 and accompanying content 36.

Responses by the server 34 to content requests by the client 16 are sent back to the client 16 via the SLB 20 and intervening packet-switched network 18.

In the present specific embodiment, the network 10 employs the plural SLBs 20, 22 to host plural versions of the preferred content 36 for availability, redundancy, and resiliency purposes. For example, if the server 34 fails, the first SLB 20 may route subsequent client requests to another server in the first set of servers 24, which hosts identical content and services 36 as was hosted by the initially selected server 34. Unfortunately, in some applications, the backup server may not maintain adequate persistence information, or may be unable to replicate persistence information in a timely enough manner, that would enable it to service subsequent requests from the client 16, for example, contents of the client shopping cart 38 that were maintained by the selected website 36.

Similarly, if all of the servers 24 in the first set of servers 24 fail or are busy or lack the ability to service the request, client requests for a given website may be routed to the second SLB 22, which employs the second set of servers 26 to host versions of the selected website 36. Unfortunately, the selected website 36 may store client specific information, and may not be able to immediately replicate such data, and thus may not be similar between servers and sets of servers 24, 26.

Various emerging network applications, such as intelligent-caching applications, are implemented via appliances, such as the proxy device 12. In the present illustrative scenario, the proxy device 12 implements an intelligent-caching function, wherein content from various remote websites associated with links in the preferred website 36 are retrieved by the proxy device 12 on behalf of the client 16, possibly in advance of when the client 16 requests the content. For illustrative purposes, the links in the website 36 refer to content hosted by a remote server 44.

Assuming that all servers 24, 26 host similar content, then the problem, which is addressed by certain embodiments of the present invention, arises when the proxy device 12 tries to do DNS resolutions. The proxy device 12, which does not have the same DNS cache as the client 16, must resolve the DNS address for itself on behalf of the client. Conventionally, without use of embodiments of the present invention, the response that the proxy device 12 got from the GSS 30, 32 could be different from that received by the client 16.

Conventionally, the proxy device 12 would perform DNS requests for web addresses in the links in the selected website 36. The DNS requests would be sent to the GSS 30, 32, which would return IP addresses associated with the requested web addresses. Unfortunately, in such previous applications, the returned IP addresses or VIP addresses may correspond to different servers or SLBs than would be retrieved by the client 16 if the client 16 had sent DNS requests to the GSS 30, 32 to resolve the IP addresses associated with the links in the main website 36. Consequently, the content retrieved by the proxy device 12 could be inappropriate for the client 16.

The proxy device 12 overcomes previous address-resolution problems by employing persistence information associated with the client 16 and maintained by the GSS 30, 32 when performing address resolution on behalf of the client 16. For example, the proxy device 12 includes a persistence-data-retrieval module 46, which selectively retrieves persistence data from the GSS 30, 32. The persistence data may be maintained in the various persistence databases 40, 42 of the GSSs 30, 32. The GSSs 30, 32 share persistence data to ensure that the databases 40, 42 are coherent, i.e., synchronized with each other.

Exact details as to how the persistence-data-retrieval module 46 retrieves persistence data from the GSS mesh network 14 are application specific. Those skilled in the art with access to the present teachings may readily determine details required to retrieve appropriate persistence information to meet the needs of a given application without undue experimentation. For example, in some applications, the GSS mesh network 14 may push persistence data to the proxy device 12, which may be filtered at the proxy device 12. Alternatively, persistence data may be selectively retrieved from the GSS 30, 32 by the proxy device 12 via queries sent to the GSS 30, 32. Alternatively, the proxy device 12 may register with the GSS mesh network 14 to receive specific updates to persistence data that was previously downloaded to the proxy device 12 through the GSS mesh network 14.

In the present specific embodiment, the GSS mesh network 14 is a full mesh. Data is broadcast to all other members 30, 32 of the GSS mesh network 14. Accordingly, if the proxy device 12 joins the GSS mesh network 14, the proxy device 12 receives updates to persistence information and can filter them. If the proxy device 12 chooses to query, the proxy device 12 may query a single GSS, such as the first GSS 30 or the second GSS 32, since the GSS mesh network 14 keeps all persistence information in the GSSs 30, 32 coherent, i.e., consistent and synchronized.

Accordingly, when the proxy device 12 accesses a particular link in the website 36, the proxy device 12 may employ persistence data provided by the persistence-retrieval module 46 to fashion a DNS request on behalf of the client 16. The persistence-retrieval module 46 module may update a local cache or other database, such as its own partial or full proximity database, which may be included in the proxy device 12, as discussed more fully below.

The resulting DNS request may be sent to the GSS 30, 32. The GSS 30, 32 will then return an IP address associated with the web address that is associated with the desired link. The returned IP address will correspond to the same IP address that would be returned to the client 16 if the client 16 had issued the DNS request itself.

The persistence information retrieved and/or maintained by the persistence-retrieval module 46 enables the proxy device 12 to determine, via the GSS mesh network 14, which server the client 16 would be routed to for a particular link or associated web address.

In the present example, the proxy device 12 sends a DNS request pertaining to a web address corresponding to a hyperlink in the website 36. The DNS request is sent by the proxy device 12 to the GSS 30, 32, which returns the VIP of the second SLB 22. The second SLB 22 may then map requests associated with the appropriate client persistence data to the remote server 44 of the second set of servers 36. If the client 16 had resolved the same web address itself, instead of having the proxy device 12 resolve the web address, subsequent client requests for web content associated with the web address would be routed to the same remote server 44.

Accordingly, content retrieved by the proxy device 12 on behalf of the client 16 will be similar to the content that would be retrieved if the client 16 had browsed directly to the server 44. This is occurs in part because persistence information from the GSS 30, 32 associated with the client 16 was employed by the proxy device 12, i.e. the appliance 12, to resolve the DNS associated with the domain name that is associated with the remote server 44.

While the embodiment 10 of FIG. 1 has been discussed with respect to a particular network architecture, other types of network architectures may be employed without departing from the scope of the present invention. For example, the GSS mesh network 14 may be replaced with one or more different types of network entities, such as a DNS. Furthermore, the embodiment 10 may apply to scenarios involving any number of clients, SLBs, servers, and so on, without departing from the scope of the present invention.

Generally, any network application wherein one or more network entities perform actions, such as retrieving data and/or resolving addresses, such as IP addresses associated with web pages, on behalf of one or more other devices or entities may benefit from certain embodiments of the present invention. By enabling a proxy device to employ persistence data to retrieve appropriate content from various sites or perform other actions on behalf of another entity may yield significant improvements in network Quality of Service (QOS), especially in networks employing proxy devices.

Figure 2:
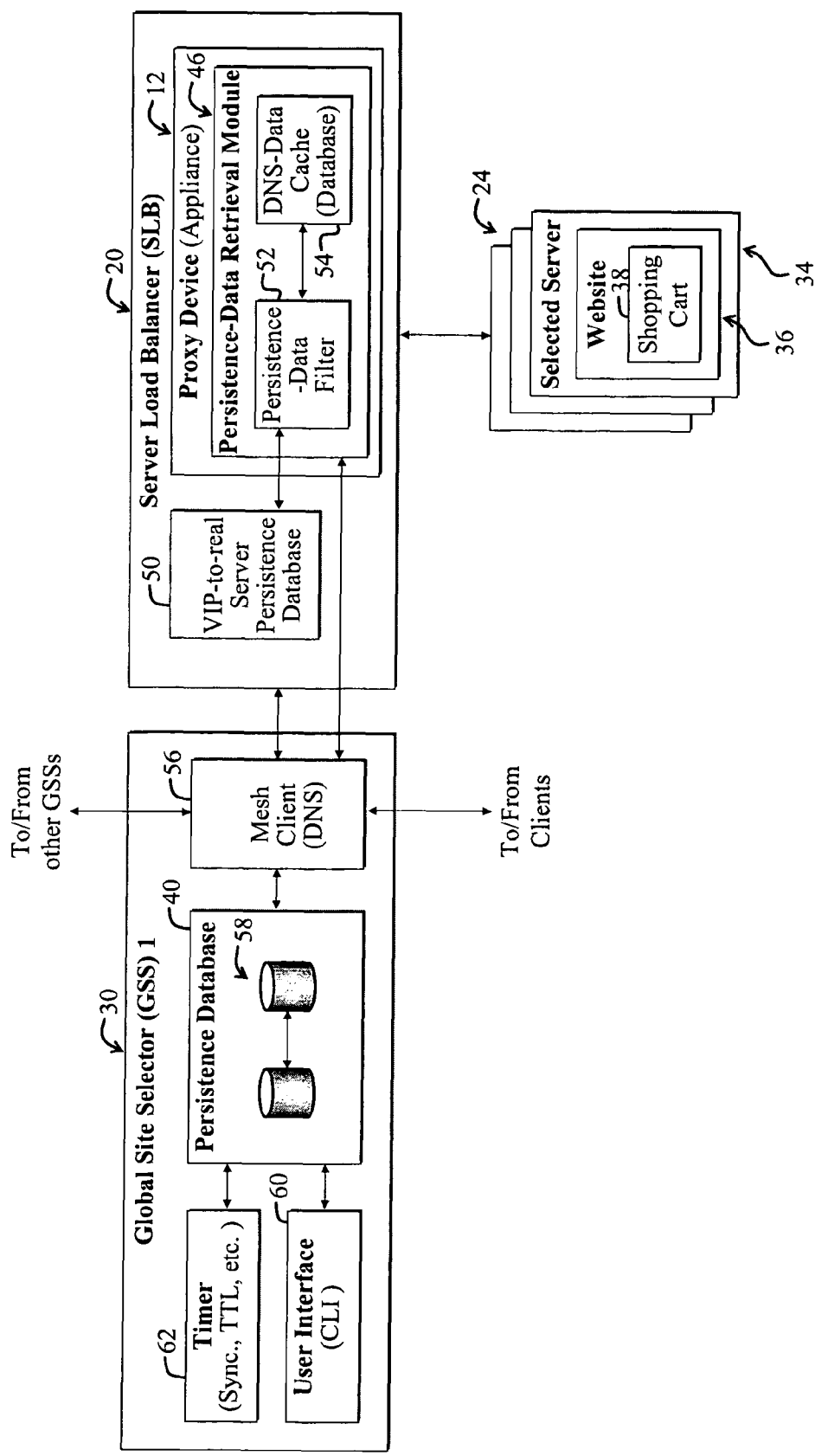
FIG. 2 is a more detailed diagram illustrating exemplary contents of a GSS module and the network proxy device of FIG. 1.

FIG. 2 is a more detailed diagram illustrating exemplary contents of a GSS module 30 and the network proxy device 12 of FIG. 1. In the present specific embodiment, the network proxy device 12, also called an appliance, is implemented in the first SLB 20. Note that the network proxy device 12 may be implemented separately from the first SLB without departing from the scope of the present invention.

The SLB 20 includes a VIP-to-real server persistence database 50, which communicates with the appliance 12. The appliance 12 includes the persistence-information retrieval module 46, which includes a filter 52 in communication with a DNS cache 54.

The GSS 30 includes a mesh client 56, which communicates with the persistence-data retrieval module 46 and the second GSS 32 of FIG. 1. The first GSS 30 further includes the first persistence database 40, which communicates with the mesh client 56 and includes plural sub-databases 58. The first persistence database 40 may communicate with a GSS user interface 60 and a timer 62. The user interface 60 may be implemented via a Command Line Interface (CLI), Graphical User Interface (GUI) or other type of user interface. The timer 62 may selectively trigger the first persistence database 40 to discard certain contents after a predetermined Time To Live (TTL) interval.

In operation, with reference to FIGS. 1 and 2, in the present specific embodiment, the network proxy device 12 initially registers with the mesh client 56 and is configured to receive persistence-information updates pertaining to the client 16 of FIG. 1 from the GSS mesh 14, as needed. The filter 52 may filter updates from the GSS mesh client 56 so that only persistence information associated with particular clients for which the appliance 12 is operating is stored in the DNS cache 54. Generally, the DNS cache 54 stores persistence information pertaining to clients for which the appliance is retrieving data or performing other functions. Requisite software and/or hardware routines for enabling the proxy device 12 to register with the GSS mesh 14 may readily be developed by those skilled in the art without undue experimentation.

The appliance 12 may retrieve local content and/or remote content on behalf of the client 16. Remote content may reside on a non-local server or entity, such as a server that is fronted by an SLB other than the first SLB 20. Similarly, local content may be content that is hosted by a server, such as one of the servers 24, that is fronted by the first SLB 20. In the present specific embodiment, when retrieving local content on behalf of the client 16, the appliance 12 selectively accesses local persistence data maintained by the VIP-to-real server persistence database 50 that resides in or is otherwise coupled to the first SLB 20.

Conventionally, content requests issued by the proxy device 12 are sent to the first SLB 20 and processed similar to other requests. To track VIP-to-real persistence data in accordance with the present embodiment, three methods may be employed, including a first method wherein the proxy device 12 queries the persistence database 50 in the first SLB 20. A second method involves the proxy device 12 spoofing the IP address of the client 16. A third method involves the proxy device 12 incorporating the client IP information in the request, such as in a custom HTTP header field.

In the case of the third method, which is preferred in the present embodiment, the proxy device 12 sends requests to the first SLB 20 along with the client IP-address information, thereby allowing the SLB 20 to glean the client IP-address information from the request, and process the request as though they came from the client 16. The first SLB 20 then automatically applies the appropriate persistence data in response to the request.

The connection between the proxy device 12 and the first SLB 20 is marked as having originated from the proxy device 12 so that responses by the SLB 20 to the initial request are not sent back to the client 16, but to the proxy device 12. In the case wherein the proxy device 12 is embedded within the first SLB 20, a simple software modification may be employed to mark such connections as being from the proxy device 12.

The local persistence data may include information pertaining to how a request from a particular client, such as the client 16, is mapped to a particular server among the first set of servers 24. In this case, the appliance 12 may optionally spoof the client 16.

After the appliance 12 retrieves appropriate content, uploads appropriate content to a server, executes a service, such as a command on a server, or performs another action on behalf of the client 16, subsequent requests for the content by the client 16 result in the content being pulled from the appliance 12 by the client 16 instead of from a remote server, thereby potentially saving time. One or more additional routines for causing the client 16 to pull pre-fetched content from the appliance 12 may be implemented in software running on the servers 24 and/or in the appliance 12. Various routines and modules for enabling a client to retrieve content from an appliance or other service module or to perform another action, such as uploading content, are known in the art.

Pre-fetching may be any activity performed by a pre-fetch function, which may be performed by a pre-fetch module. A pre-fetch function may be any feature and/or accompanying routine that is adapted to retrieve information in advance of when the information will be requested or needed by the feature and/or accompanying routine and/or another device or entity in communication with the feature and/or accompanying routine.

While the present operative scenario has been discussed with respect to a pre-fetching function, other functions are possible. For example, the appliance 12 may be implemented via a security device that performs security operations, such as a firewall, an intrusion-detection system, extrusion-detection system, XML schema validation, and so on. Examples of additional service modules that may also act as suitable appliances include Content Engines (CEs), anomaly detectors, and so on.

Security operations may be any actions performed to prevent undesirable network activity. Examples of security operations include operations performed by security modules, including firewalls, antivirus applications, anomaly detectors, intrusion detectors, and so on.

Generally, any application that involves resolving domain names or other web address on behalf of a client may benefit by employing persistence information in accordance with certain embodiments disclosed herein.

Figure 3:
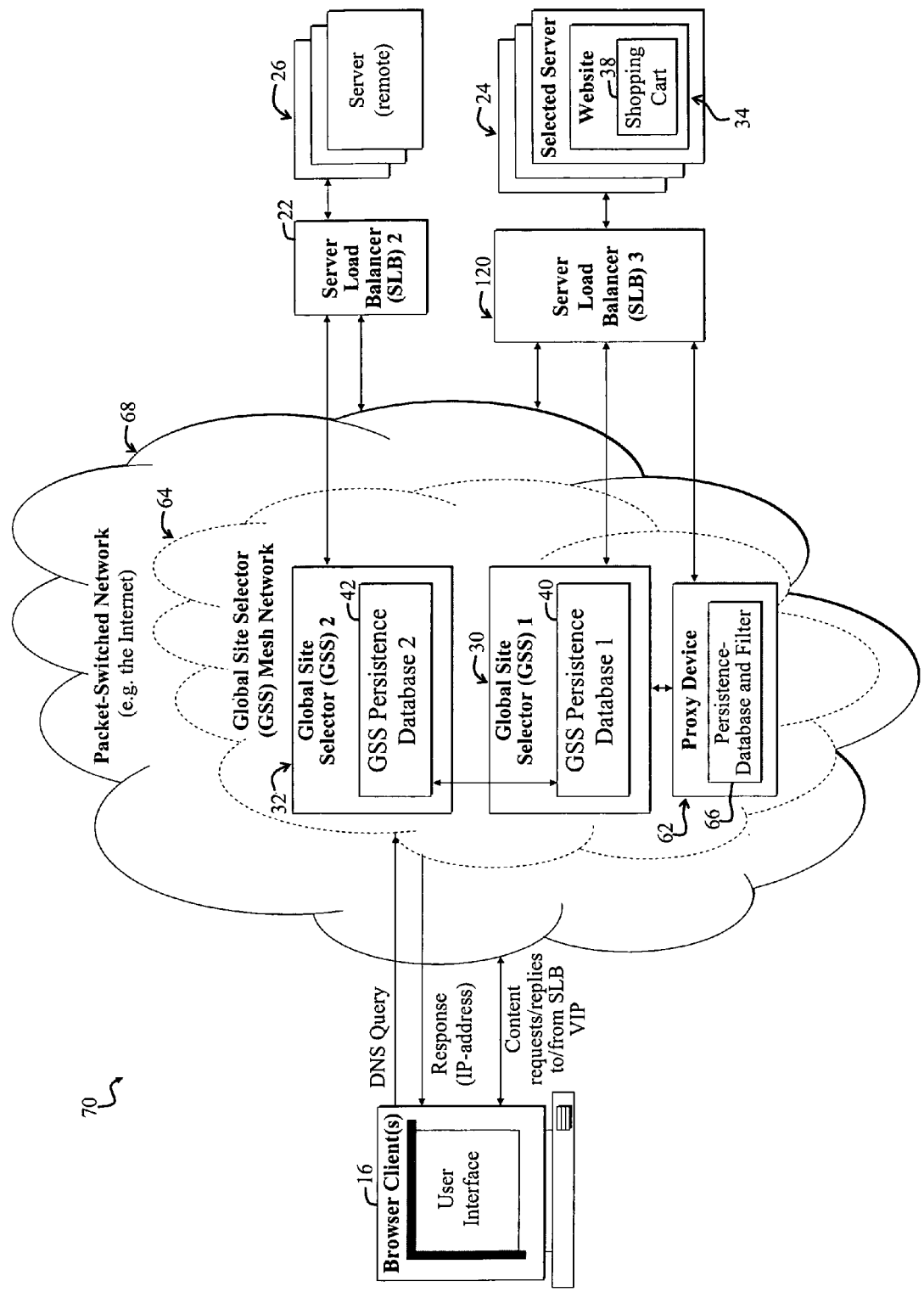
FIG. 3 is a diagram illustrating a first alternative network for enforcing DNS persistence, wherein the network proxy device is integrated in the GSS mesh network.

FIG. 3 is a diagram illustrating a first alternative network 70 for enforcing DNS persistence wherein a network proxy device 62 is integrated in a modified GSS mesh network 64, which is included in a modified packet-switched network 68. The network 70 of FIG. 3 is similar to the network 10 of FIG. 2 with the exception that the appliance 12 of FIG. 2 is not integrated in the first SLB 20, but instead is incorporated in the augmented mesh network 64. Note that the appliance 12 of FIG. 2 may be integrated with the GSS mesh network 14 of FIG. 1 while being implemented in the first SLB 20, without departing from the scope of the present invention.

With reference to FIGS. 2 and 3, the embodiment of FIG. 2 involves the appliance 12, which is integrated with the first SLB 20, registering for updates with the GSS mesh 14 and selectively receiving persistence information, from the GSS mesh 14, pertaining to desired clients, such as the client 16. The resulting updates are then filtered by the filter 52 of FIG. 2.

The embodiment disclosed in FIG. 3 involves an alternative appliance 62, which is coupled to a third SLB 120 (instead of being included therein) and is integrated with the augmented GSS mesh network 64. The appliance 62 includes a persistence database and filter 66. Since the appliance 62 is integrated with the augmented GSS mesh network 64, it receives a copy 66 of the persistence databases 40, 42 of the constituent GSSs 30, 32. The persistence database and filter 66 may include a full copy of or a subset of the GSS persistence databases 40, 42. When the appliance wishes to obtain persistence data, an accompanying filter is employed to extract the appropriate persistence data from the database and filter 66 as needed.

If appropriate persistence information is not available for a given client for a given action to be performed by the appliances 12, 62, then the appliances 12, 62 are configured to perform conventional IP-address resolution without the aid of the persistence information.

In an alternative implementation, the appliances 12, 62 selectively query the GSS 30, 32, for desired persistence information based on one or more client IP addresses as discussed more fully below. Alternatively, persistence information that is sent from the GSS mesh networks 14, 64 to the appliances 12, 62 may be filtered on the GSS mesh networks 14, 64 before it is sent to the appliances 12, 64.

Figure 4:
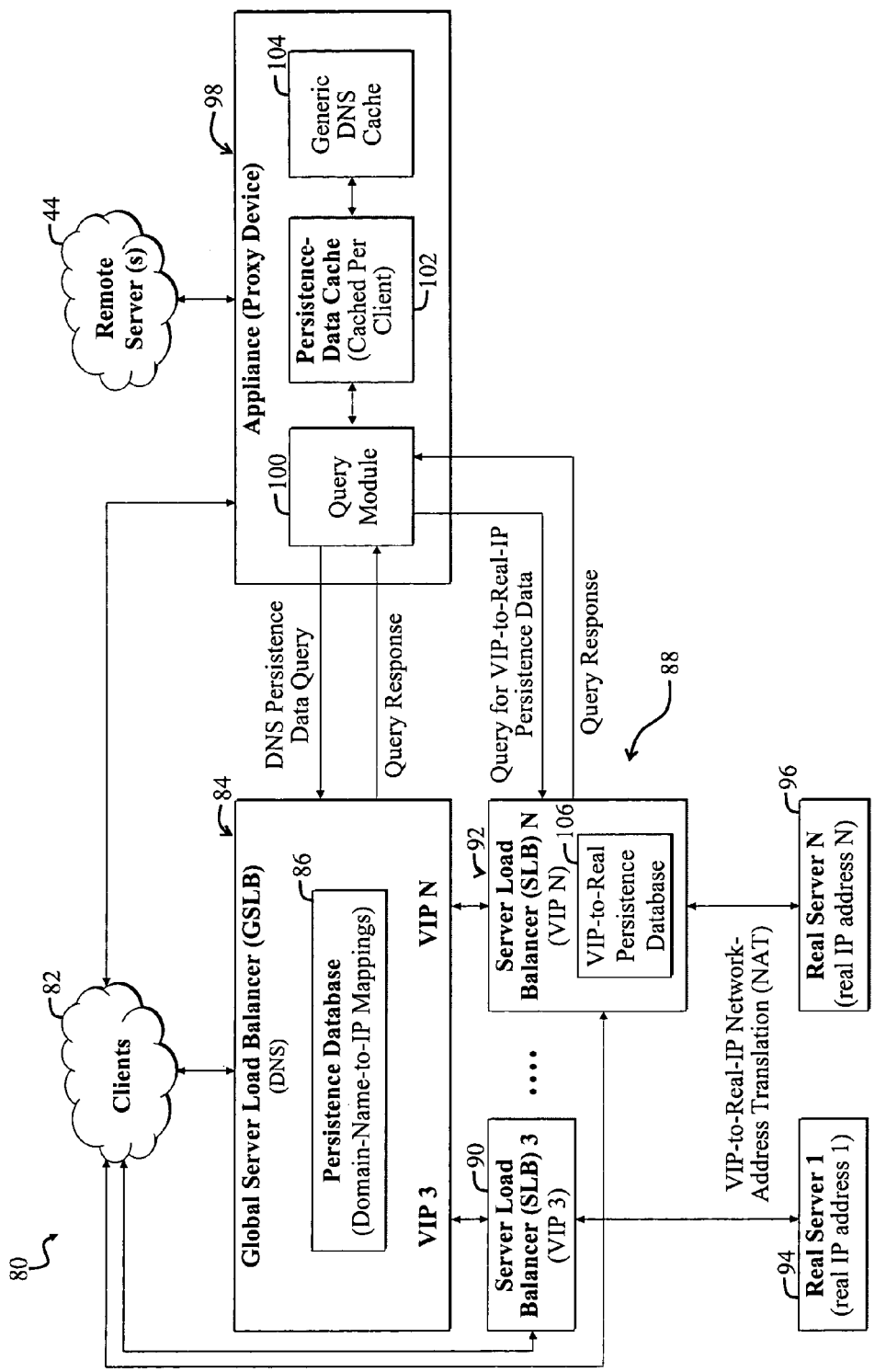
FIG. 4 is a diagram illustrating an alternative network for enforcing DNS persistence according to a second embodiment of the present invention.

FIG. 4 is a diagram illustrating an alternative network 80 for enforcing DNS persistence according to a second embodiment of the present invention. The network 80 includes plural clients 82 in communication with a Global Server Load Balancer (GSLB) 84, which includes a GSLB persistence database 86 that includes domain-name-to-IP-address persistence information. The GSLB 84 fronts plural SLBs 88, including a third SLB 90 and an $N^{th}$ SLB 92, each associated with distinct VIP addresses. The third SLB 90 fronts a first real server 94, and the $N^{th}$ SLB 92 fronts an $N^{th}$ real server 96. The real servers 94, and 96 are associated with so-called real IP addresses. For the purposes of the present discussion, a real IP address may be an IP address that is associated with an entity, such as a server, that does not front another entity whose IP address is based on a NAT of the server.

The alternative network 80 includes an alternative appliance 98, which is coupled to the $N^{th}$ real server 96. The appliance 98 includes a query module 100, which communicates with a per-client-cache database 102, which communicates with a generic DNS cache database 104. For illustrative purposes, the $N^{th}$ SLB 92 is shown including a VIP-to-real persistence database 86 that maintains VIP-to-Real-IP persistence data specifying how a given client request should be mapped, via Network-Address Translation (NAT) to a particular real server, such as the $N^{th}$ real server 96.

In operation, one or more routines, such as pre-fetch, refresh, application-offload, intelligent-caching, XSLT-translation, BPEL-processing, or other routines, running on the appliance 98 require that the appliance 98 perform a DNS request on behalf of one or more of the plural clients 82. Such routines may be implemented via conventional hardware and/or software without departing from the scope of the present invention.

Before the DNS request is sent to the GSLB 84 (which implements a DNS in the present embodiment) by the appliance 98, the query module 100 sends a query to the GSLB 84 requesting relevant persistence information if the relevant persistence information is not already cached in the per-client-cache database 102.

In response to the persistence-data query from the appliance 98, the GSLB 84 accesses the GSLB persistence database 86, then retrieves the requested persistence data if available. Subsequently, the GSLB 84 then returns the requested persistence data, if available, to the appliance 100, which stores the retrieved persistence data in the per-client-cache database 102. If persistence data for a particular client for a particular appliance operation is not available, then contents from the generic DNS cache 104 are employed to implement DNS resolution on behalf of one or more clients of the plural clients 82.

Hence, the first database 102 and the second database 104 act as a multi-tier database that ensures that persistence information pertaining to a client and as stored in the per-client-cache database 102 is employed to implement DNS resolution before generic DNS resolution is performed on behalf of the client(s) 82.

In certain applications, the appliance 98 may request local content, such as from the $N^{th}$ real server 96. In such cases, the query module 100 may retrieve persistence information pertaining to the mapping between a particular VIP and a particular IP address associated with a real server for a particular client, based on the IP address of the client. The query module 100 issues a query to the $N^{th}$ SLB 92 requesting VIP-to-real IP address mappings, i.e., persistence data for a particular client. The $N^{th}$ SLB 92 then returns the persistence data to the appliance 98, after which the appliance 98 may employ the persistence information to facilitate various actions on behalf of the desired client.

The exchange of persistence information between the appliance 98 and the $N^{th}$ SLB 92 may be omitted without departing from the scope of the present invention.

Certain embodiments of the present invention are particularly useful in applications involving distributed-website architectures, wherein certain websites are hosted on multiple servers in one or more locations to enhance website availability. Such applications often employ appliances that must perform DNS resolution on behalf of a client. In such applications, circumvention of persistence policies by an appliance may reduce network QOS. However, embodiments of the present invention may be useful and may be employed in other types of applications and network architectures without departing from the scope of the present invention.

In certain distributed-website architectures, when one website or server becomes unavailable, the domain name may still retrieve a website, since client requests for the website may be routed to another available server hosting a version of the website. A GSLB, such as the GSLB 84, or an SLB, such as the N SLB 92, is often employed to facilitate routing requests to appropriate sites based on certain conditions, such as site availability, site response time, numbers of available connections to a site, and so on. The GSLB 84 may communicate with each distributed site 94, 96, 90, 92 to determine site conditions. The GSLB 84 may include a DNS and/or may communicate with a DNS to selectively map the IP address associated with a domain name so that requests are routed to the desired server hosting the site.

Certain embodiments of the present invention address a need in the art for high network QOS, better control over network traffic partitioning, more predictable traffic management, and so on. Conventionally, such characteristics are less likely to be achieved, since SLB or GSLB persistence policies are readily circumvented by appliances.

Persistence information may be any information employed to enable a client request to consistently resolve to a desired server or other entity. Examples include information specifying which server connected to a given SLB is handling the current requests for the client. Accordingly, the CE or other appliance will access the same server when performing intelligent caching for the client.

An appliance may be any device or module coupled to a network that is adapted to add functionality to the network. Examples of appliances include Cisco Content Engines (CEs), caching devices, Wide Area Network (WAN) optimization devices, Server Load Balancers (SLBs), anomaly detectors, intrusion detectors, extrusion detectors, firewalls, antivirus applications, content pre-fetching modules, XML schema validators, eXtensible Stylesheet Language Transformation (XSLT) translators, Business Process Execution Language (BPEL) processing modules, security modules, and so on.

Certain embodiments of the present invention are particularly useful for improving the quality and accuracy of functions performed on behalf of a client or other network entity by an appliance that performs DNS resolution for the client or other network entity. Generally, such appliances include proxy devices that may terminate HyperText Transfer Protocol (HTTP) or another protocol, such as another Open Systems Interconnect (OSI) Layer-7 (L7) protocol, that does DNS resolution. Layer 7 refers to protocols employed at layer 7 of the Open Systems Interconnect (OSI) standard.

An appliance equipped with and/or integrated with a network employing an embodiment of the present invention may employ a client IP address when performing local requests, such as requests servers communicating with the SLB with which the appliance is associated. However, such an appliance may employ client persistence information in combination with the IP address of the appliance when accessing to remote servers and/or sites, such as to retrieve content-sensitive and/or user-sensitive banner adds or other content.

The appliance, such as the appliance 98, may retrieve persistence information (from the GSLB 84 and/or another entity or DNS) for the mapping between the requested domain name and the VIP associated with the SLB that is associated with a server hosting the desired website that is associated with the domain name. Persistence data pertaining to another mapping between the VIP associated with the SLB and the IP address associated with the real server may also be employed by the appliance 98.

Persistence issues often arise when an appliance initiates HTTP requests on behalf of the client, where the appliance has to resolve additional DNS addresses based on the client data.

In the network 80 of FIG. 4, DNS resolution goes through a hierarchical decision process, first referencing the client-specific database 102 and then defaulting to the shared DNS cache 104.

After the appliance 98 initially registers with a DNS, such as a GSS mesh 14 of FIG. 1 or the GSLB 84 of FIG. 4 (with access to a DNS), the DNS may run one or more routines to notify the appliance 98 of new persistence data relating to the one or more clients 82. Any DNS requests on behalf of any clients for which persistence data is not maintained in the persistence-data cache 102, will employ the shared DNS cache 104 to generate a more generic DNS resolution request. Consequently, client persistence resolution is preferred by the appliance 98 over generic DNS resolution.

Hence, embodiments of the present invention, are particularly useful for use with proxy devices that may need to access one or more other websites on behalf of one or more other clients 82, but that will need to know how the client requests would be resolved by a DNS to ensure that the appliance 98 pulls data from the appropriate servers on behalf of the one or more clients 82. The information that enables the appliance 98 to accurately direct and resolve client requests may be included in the persistence information maintained by the persistence-data cache 102.

In FIG. 4, the appliance 98 and associated GSLB 84 may dynamically query a DNS, such as a DNS implemented via a GSS mesh network, for all client-specific information upon receiving a client request. The appliance 98 and GSLB 84 store the query results in local databases 86, 102, 104. In the preferred embodiment, DNS requests are augmented with additional information, such as client IP address. The GSLB 84 may use the client IP address for persistence lookups, i.e., to facilitate retrieving appropriate persistence information from the persistence database 86. A proprietary protocol may be employed to facilitate such DNS requests. Alternatively, a standard DNS protocol may be extended to include the additional client IP address and/or other additional information. Those skilled in the art with access to the present teachings may readily implement such a protocol without undue experimentation.

Furthermore, the network 80 may facilitate a method for applications, such as the appliance 98, to query a DNS and/or GSLB, such as the GSLB 84, for client-persistence information, and then register for updates with the DNS and/or GSLB using that information to enforce client persistence policies for proxied requests. Additional methods are discussed more fully below.

Hence, certain embodiments of the present invention may enable higher QOS for the clients 82, as GSLB policies are enforced and not circumvented by the appliance 98. Furthermore, certain embodiments of the present invention may provide service providers better control over network traffic partitioning, thereby improving traffic-management predictability and user-perceived response quality.

Figure 5:
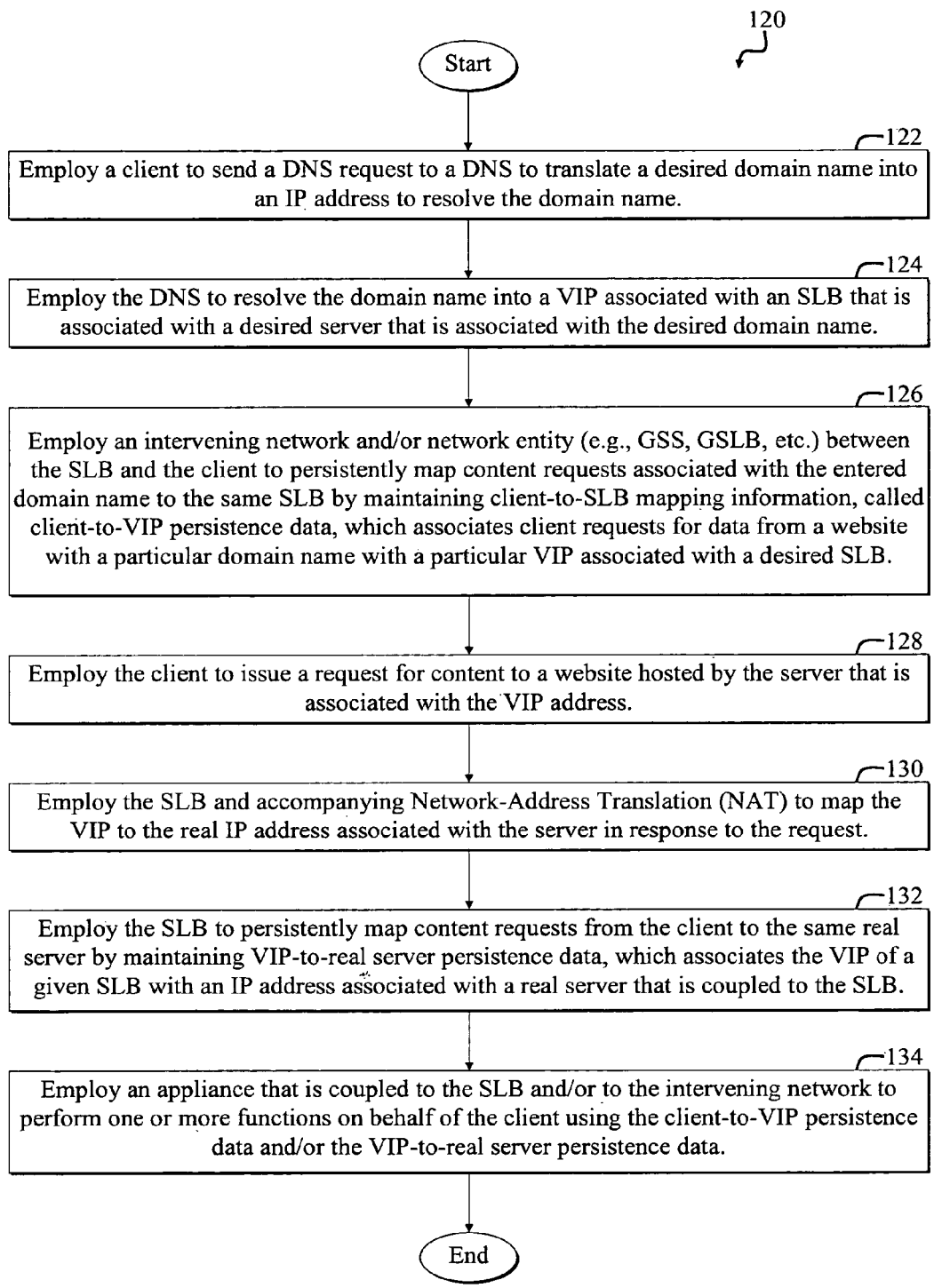
FIG. 5 is a flow diagram of a method adapted for use with the networks of FIGS. 1-5.

FIG. 5 is a flow diagram of a method 120 adapted for use with the networks 10, 70, 80 of FIGS. 1-4. The method 120 includes a first step 122, which includes employing a client to send a DNS request to a DNS, such as GSS 30 of FIG. 1, to translate a desired domain name into an IP address to resolve the domain name.

A second step 124 includes employing the DNS to resolve the domain name into a VIP associated with an SLB, such as the first SLB 20 of FIG. 1, that is associated with a desired server, such as the selected server 34 of FIG. 1, that is associated with the desired domain name.

A third step 126 involves employing an intervening network and/or network entity (e.g., GSS, GSLB, etc.) between the SLB and the client to persistently map content requests associated with the entered domain name to the same SLB by maintaining client-to-SLB mapping information, called client-to-VIP persistence data, which associates client requests for data from a website with a particular domain name with a particular VIP associated with a desired SLB.

A fourth step 128 includes employing the client to issue a request for content to a website, such as the website 36 of FIG. 1, hosted by the server that is associated with the VIP address.

A fifth step 130 involves employing the SLB and accompanying Network Address Translation (NAT) to map the VIP to the real IP address associated with the server in response to the request.

A sixth step 132 involves employing the SLB to persistently map content requests from the client to the same real server by maintaining VIP-to-real server persistence data, which associates the VIP of a given SLB with an IP address associated with a real server that is coupled to the SLB.

A seventh key step 134 involves employing an appliance that is coupled to the SLB and/or to the intervening network to perform one or more functions on behalf of the client using the client-to-VIP persistence data and/or the VIP-to-real server persistence data.

Various steps 122-134 of the method 120 may be omitted, changed, or reordered without departing from the scope of the present invention. For example, the appliance involved in the seventh key step 134 may not necessarily employ VIP-to-real server persistence data without departing from the scope of the present invention. As another example, the method 120 may be replaced with a more generalized method without departing form the scope of the present invention. An exemplary more generalized method involves maintaining persistence information pertaining to a connection between a client and a server and then selectively employing the persistence information to facilitate implementing an appliance for the client.

Certain embodiments of the present invention are particularly useful in data-center applications, where service modules that perform DNS requests on behalf of clients are increasingly employed. By ensuring that the service modules and appliances act according to preestablished persistence policies regarding routing of client requests, enhanced network Quality Of Service (QOS) is achievable.

Various embodiments of the invention may be implemented via hardware and/or software. Software modules may readily be implemented to run on an Internetworking Operating System (IOS) without undue experimentation by those skilled in the art.

Certain embodiments of the present invention are particularly useful for implementing network-security features, advertisement serving, shopping carts, content optimization, content transformation and so on. Those skilled in the art may readily deploy embodiments of the present invention in various different applications without departing from the scope thereof.

Although embodiments of the invention are discussed primarily with respect to server-client architecture, any acceptable architecture, topology, protocols, or other network and digital processing features can be employed. In general, network controllers, managers, access points, endpoints, clients, and so on, can be implemented via any device with processing ability or other requisite functionality.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using a programmed general purpose digital computer; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A device comprising:
    a server load balancer (SLB) having an associated virtual internet protocol (VIP) address, wherein the server load balancer comprises a persistence-data retrieval module configured to retrieve persistence information associated with a client;
    a persistence database that is remote from the client and the server load balancer, the persistence database being configured for maintaining data selected from the group consisting of:
        associations between a domain name and a client internet protocol (IP) address,
        mappings between the domain name and the client IP address,
        persistence policies, and
        persistence rules,
    a network node, the network node being configured to map content requests associated with a domain name associated with a server to the server load balancer, wherein the server load balancer is configured to map an IP address associated with domain name information hosted the server to the VIP address, and wherein the server load balancer is configured to map the content requests to the server; and
    an application configured to employ the persistence information to perform a function for the client via a network.

2. The device of claim 1, wherein the persistence information comprises information enabling the application to resolve one or more domain names.

3. The device of claim 2, wherein the persistence information comprises information specifying the IP address to which a given client domain name server (DNS) request resolves.

4. The device of claim 1, wherein the persistence information comprises mapping information that specifies the specifying IP address to which a given VIP address resolves for a specific client request.

5. The device of claim 1, wherein the persistence data retrieval module is configured to selectively obtain some or all of the persistence information from an entity that maintains some or all of the persistence information.

6. The device of claim 5, wherein the network node comprises a global site selector (GSS) and/or a global server load balancer (GSLB).

7. The device of claim 6, wherein the persistence data retrieval module comprises one or more routines configured to selectively query the network node for some or all of the persistence information.

8. The device of claim 6, wherein the device is integrated with the network node in the mesh network and is configured to automatically receive updates to the persistence information via the mesh network.

9. The device of claim 1, wherein the function comprises an operation for retrieving data for the client via the network, wherein the data comprises data residing on at least one server that is not fronted by the server load balancer (SLB) that is coupled to the device.

10. The device of claim 1, wherein the persistence information comprises first persistence data pertaining to one or more mappings between one or more domain names and one or more IP addresses, wherein each of the mappings are associated with one or more clients, wherein the one or more clients includes the first client.

11. The device of claim 10, wherein the one or more IP addresses comprises one or more VIP addresses.

12. The device of claim 10, wherein the persistence information further comprises second persistence data pertaining to one or mappings between one or more VIP addresses and one or more servers.

13. The device of claim 12, wherein the persistence database is coupled to an intervening network entity that is coupled between the first client and the SLB that is associated with the VIP.

14. The device of claim 13, further comprising a second database coupled to the SLB, wherein the second database maintains the second persistence data.

15. The device of claim 14, further comprising one or more routines running on the application, wherein the one or more routines are configured to selectively retrieve at least one of the first persistence data and the second persistence data to facilitate performing the function.

16. The device of claim 15, wherein the function comprises one or more of the following operations associated with the application:
    pre-fetching;
    refreshing content displayed in a web browser associated with the client;
    security operations;
    selective retrieval of advertisements;
    content optimization; and
    content transformation.

17. The device of claim 14, wherein the application comprises a content engine (CE).

18. The device of claim 13, wherein the intervening network entity comprises a global site selector (GSS).

19. The device of claim 13, wherein the intervening network entity comprises a global server load balancer (GSLB).

20. The device of claim 1, wherein the network node is remote from the server load balancer.

21. The device of claim 1, wherein the persistence database is configured for maintaining the data related to the associations between the domain name and the client internet protocol address.

22. The device of claim 1, wherein the persistence database is configured for maintaining the data related to the mappings between the domain name and the client IP address.

23. The device of claim 1, wherein the persistence database is configured for maintaining the data related to the persistence policies.

24. The device of claim 1, wherein the persistence database is configured for maintaining the data related to the persistence rules.

25. A system comprising:
- a server load balancer (SLB) having an associated virtual internet protocol (VIP) address, wherein the server load balancer comprises a persistence-data retrieval module configured to retrieve persistence information associated with a client;
- a persistence database that is remote from the client and the server load balancer, the persistence database being configured for maintaining data selected from the group consisting of:
  - associations between a domain name and a client internet protocol (IP) address,
  - mappings between the domain name and the client IP address,
  - persistence policies, and
  - persistence rules,
- a network node, the network node being configured to map content requests associated with a domain name associated with a server to the server load balancer, wherein the server load balancer is configured to map an IP address associated with domain name information hosted by the server to the VIP address, and wherein the server load balancer is configured to map the content requests to the server; and
- an application configured to employ the persistence information to perform a function for the client via a network.

26. A non-transitory computer readable medium including instructions executable by a processor, the non-transitory computer readable medium comprising one or more instructions for:
- identifying persistence information associated with a client using a server load balancer (SLB), the server load balancer having an associated virtual internet protocol (VIP) address, wherein the server load balancer comprises a persistence-data retrieval module configured to retrieve persistence information associated with the client;
- retrieving the persistence information associated from a persistence database that is remote from the client and the server load balancer, the persistence database being configured for maintaining data selected from the group consisting of:
  - associations between a domain name and a client internet protocol (IP) address,
  - mappings between the domain name and the client IP address,
  - persistence policies, and
  - persistence rules,
- using a network node, the network node being configured to map content requests associated with a domain name associated with a server to the server load balancer, wherein the server load balancer is configured to map an IP address associated with domain name information hosted by the server to the VIP address, and wherein the server load balancer is configured to map the content requests to the server; and
- running an application configured to employ the persistence information to perform a function for the client via a network.

27. A method comprising:
- identifying persistence information associated with a client using a server load balancer (SLB), the server load balancer having an associated virtual internet protocol (VIP) address, wherein the server load balancer comprises a persistence-data retrieval module configured to retrieve persistence information associated with the client;
- retrieving the persistence information associated from a persistence database that is remote from the client and the server load balancer, the persistence database being configured for maintaining data selected from the group consisting of:
  - associations between a domain name and a client internet protocol (IP) address,
  - mappings between the domain name and the client IP address,
  - persistence policies, and
  - persistence rules,
- using a network node, the network node being configured to map content requests associated with a domain name associated with a server to the server load balancer, wherein the server load balancer is configured to map an IP address associated with domain name information hosted by the server to the VIP address, and wherein the server load balancer is configured to map the content requests to the server; and
- running an application configured to employ the persistence information to perform a function for the client via a network.

28. An apparatus comprising:
- a remote server load balancer having an associated virtual internet protocol (VIP) address, wherein the remote server load balancer comprises a persistence-data retrieval module configured to retrieve persistence information associated with a client;
- a remote persistence database, the remote persistence database being configured for maintaining data selected from the group consisting of:
  - associations between a domain name and a client internet protocol (IP) address,
  - mappings between the domain name and the client IP address,
  - persistence policies, and
  - persistence rules,
- a remote network node, the remote network node being configured to map content requests associated with a domain name associated with a server to the remote server load balancer, wherein the remote server load balancer is configured to map an IP address associated with domain name information hosted by the server to the VIP address, and wherein the remote server load balancer is configured to map the content requests to the server; and
- an application configured to employ the persistence information to perform a function for the client via a network.

29. The apparatus of claim 28, wherein the remote server load balancer, the remote persistence database, the remote network node and the client are remote from one another.

* * * * *